United States Patent [19]

Badger et al.

[11] 4,275,470
[45] Jun. 30, 1981

[54] VACUUM-FLUSH TOILET ARRANGEMENT FOR AIRCRAFT

[75] Inventors: Everett H. Badger; Michael J. Rogerson, both of La Habra, Calif.

[73] Assignee: Rogerson Aircraft Controls, Los Angeles, Calif.

[21] Appl. No.: 68,131

[22] Filed: Aug. 20, 1979

Related U.S. Application Data

[63] Continuation of Ser. No. 58,586, Jul. 18, 1979.

[51] Int. Cl.³ .............................................. B64D 11/02
[52] U.S. Cl. ........................................ 4/316; 4/431; 251/5; 251/61.1
[58] Field of Search ................... 4/431, 316, DIG. 11, 4/318, 415, 111; 251/61.1, 5

[56] References Cited

U.S. PATENT DOCUMENTS

| 2,749,558 | 6/1956 | Lent et al. | 4/316 |
|---|---|---|---|
| 3,034,131 | 5/1962 | Lent | 4/316 X |
| 3,083,943 | 4/1963 | Stewart, Jr. et al. | 251/61.1 |
| 3,100,002 | 8/1963 | Moore | 251/61.1 |
| 3,329,974 | 7/1967 | Balasco | 4/316 |
| 3,340,543 | 9/1967 | Cella | 4/316 |
| 3,340,544 | 9/1967 | Cella | 4/316 |
| 3,350,053 | 10/1967 | Schmitz | 251/5 |
| 3,482,267 | 12/1969 | Liljendahl | 4/431 |
| 3,663,970 | 5/1972 | Drouhard, Jr. et al. | 4/111 |
| 3,720,962 | 3/1973 | Harrah | 4/415 |
| 3,922,730 | 12/1975 | Kemper | 4/318 |
| 3,950,249 | 4/1976 | Eger et al. | 4/318 X |
| 3,974,528 | 8/1976 | Claunch et al. | 4/DIG. 11 X |
| 3,995,328 | 12/1976 | Carolan et al. | 4/316 |
| 4,063,315 | 12/1977 | Carolan et al. | 4/316 |

Primary Examiner—Henry K. Artis
Attorney, Agent, or Firm—Whann & McManigal

[57] ABSTRACT

A non-circulating vacuum operated waste disposal system for aircraft having a toilet bowl connected to a vacuum waste holding tank by a drain connected to said bowl and to the vacuum waste holding tank. There is a flush valve in the drain having a flexible valve element movable between open and closed positions for opening or closing the drain. There is a control pressure chamber adjacent to the flexible valve element with the valve element exposed directly to the pressure or vacuum which may be within said control chamber. The valve element is held in open or closed position with respect to the drain depending upon whether there is a pressure or a vacuum in the pressure chamber. There is a connection from the pressure chamber to the cabin of the aircraft and also to the drain on the vacuum side of the flush valve. A solenoid valve is provided in the connection which is manually operable to connect cabin pressure or the vacuum in the drain to said control pressure chamber.

12 Claims, 4 Drawing Figures

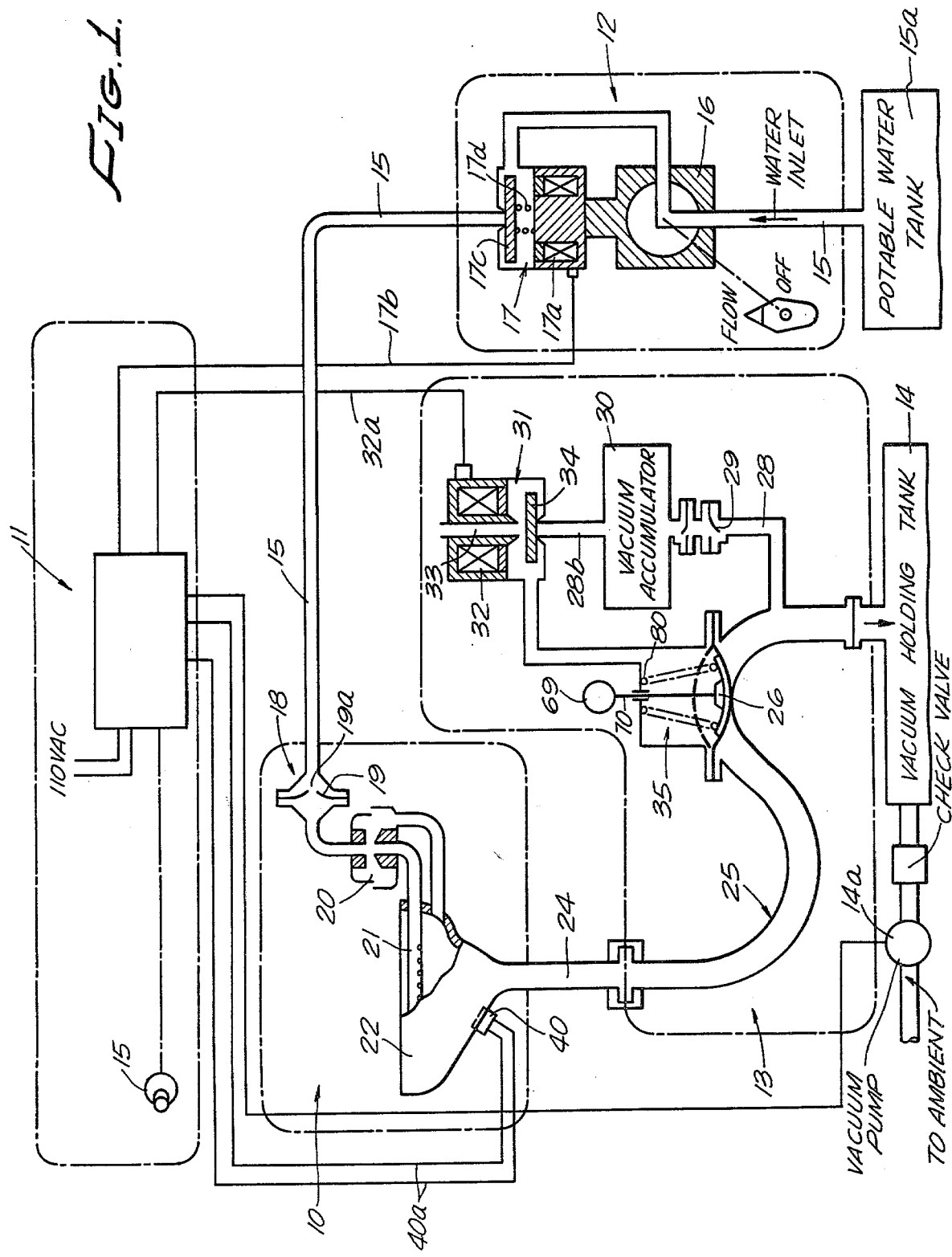

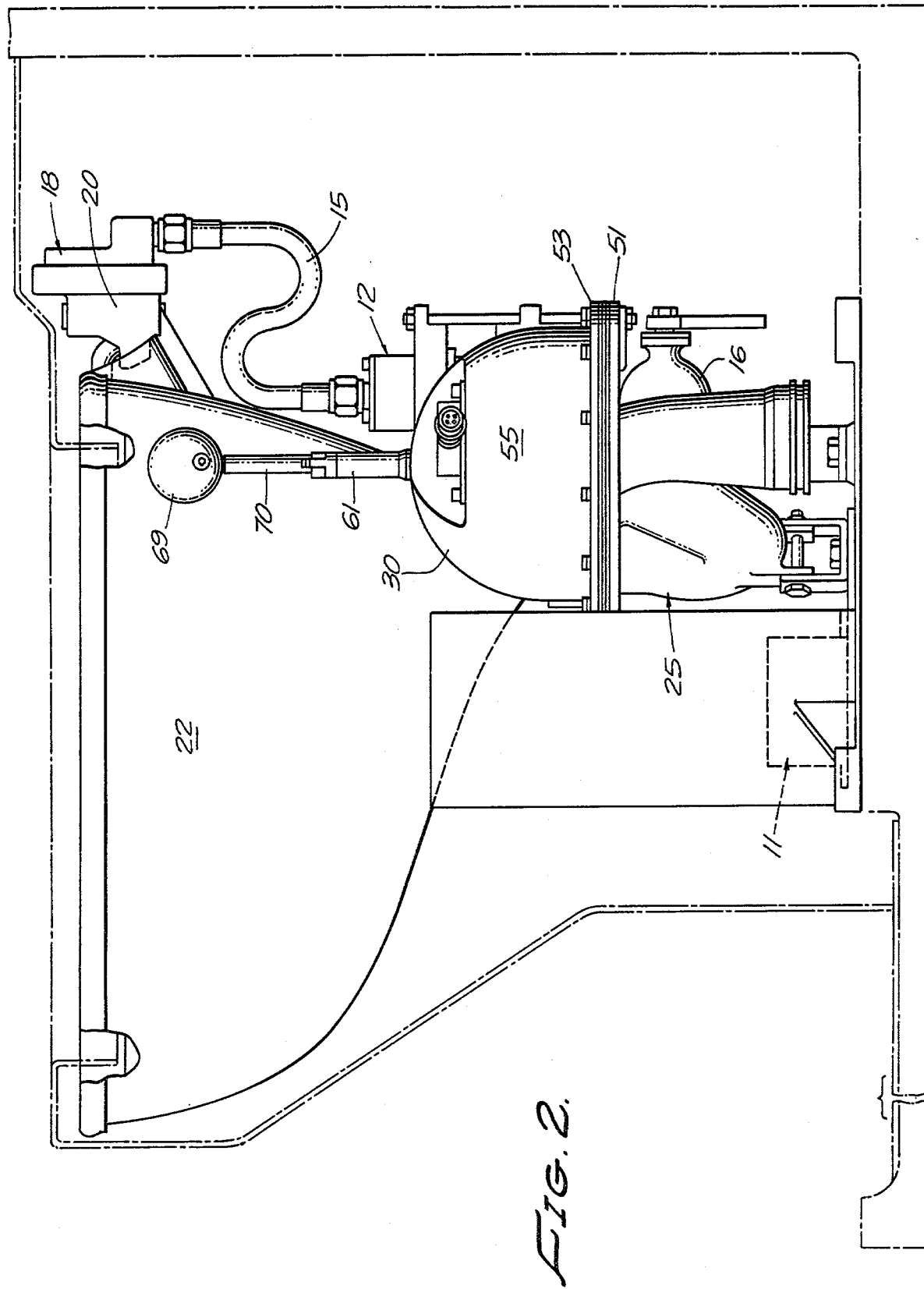

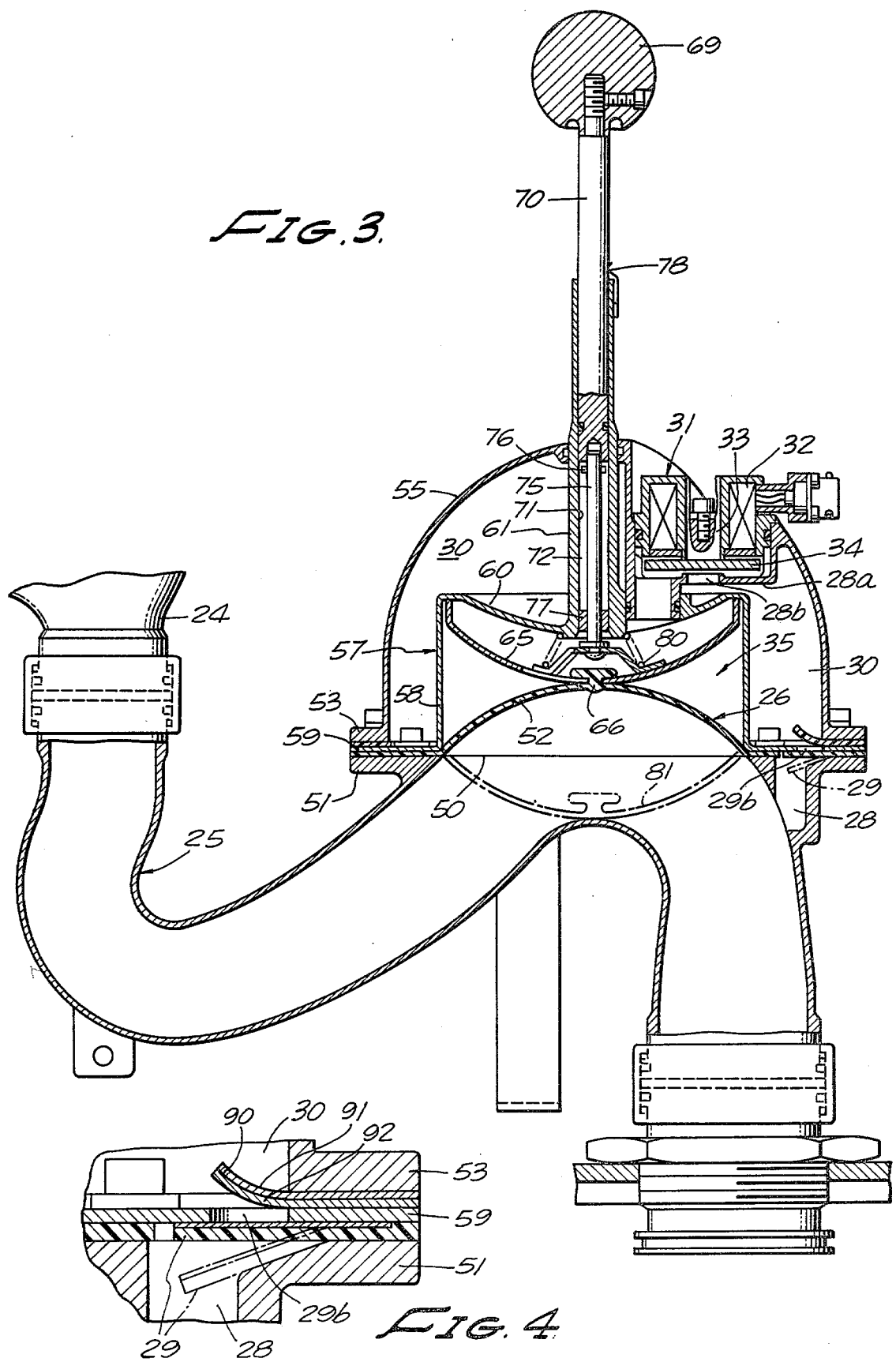

VACUUM-FLUSH TOILET ARRANGEMENT FOR AIRCRAFT

This application is a continuation of our application entitled VACUUM FLUSH TOILET ARRANGEMENT FOR AIRCRAFT filed in the United States Patent Office on July 18, 1979 and described as Ser. No. 58,586.

The present invention relates to a vacuum-flush toilet waste system particularly designed for use in passenger carrying aircraft and to a method or process of the disposing of toilet bowl waste matter.

DESCRIPTION OF THE PRIOR ART

It is known in the prior art to use vacuum pressure to assist or carry out flushing operations in waste disposal systems in passenger vehicles such as buses, trains and aircraft. Currently, vacuum flush recirculating toilet systems are being used on commercial aircraft.

Such prior art systems, as shown for example by U.S. Pat. No. 3,995,328, Carolan et al., and U.S. Pat. No. 3,922,730, Kemper, employ a vacuum-powered toilet waste transmitting system in combination with a filtration process that recovers sufficient liquid from the waste matter so that the liquid, by being deodorized and appropriately colored, can be recycled as the flushing fluid. Vacuum pressure to operate these systems at lower elevations is provided by a blower system, whereas in flight at altitude, vacuum pressure is maintained by venting the system to the outside ambient air.

Such prior art systems have a number of disadvantages in that they are complex systems requiring numerous pumps, valves, filtration units and means for deodorizing and sanitizing the liquid waste used as the recirculating flushing fluid. As a result of this complexity, such systems, while an improvement over gravity flow systems, are still relatively heavy and require a high degree of maintenance without a commensurate improvement in the overall reliability of the system. Specific disadvantages are: holding tank filters and valves are prone to clogging by disintegrating paper which reverts to pulp, thereby reducing the efficiency and reliability of the system; recirculating flush water pumps and rinse systems tend to accumulate mineral deposits precipitated from the waste material; the use of recirculated waste with its attendant sanitary problems; and possible leakage into the airplane with resultant corrosion of airframe components.

SUMMARY OF THE INVENTION

The present invention is superior to any vacuum-flush toilet known to applicant and consists of a method and apparatus which is unique in its entirety and also includes sub-combinations and sub-assemblies which are unique in the steps performed and in the construction and operation of the parts. More particularly, the present invention is a modularized vacuum-flush toilet in which a relatively small amount of fresh water and a vacuum created by the aircraft environment or an auxiliary vacuum pump provide the motive force to convey waste to a modularized holding tank system.

The advantages of the fresh water flush-system of the present invention over conventional systems utilizing filtered recirculated waste is that it enables modular design of major system elements to be converted into self-contained units thereby reducing overall system operating weight, and permitting a variety of installation configurations for original equipment as well as retrofit installation in existing aircraft. In addition the modularizing of major components simplifies aircraft servicing and enhances the system's overall reliability by minimizing the number of component parts.

The fresh water vacuum-flush system of the present invention is comprised of two basic self-contained systems, a completely self-contained toilet module and a self-contained waste holding module. The toilet module is broken down into four basis subsystems which in turn are modularized for ease of maintenance and simplicity of operation. They are a bowl module, a flush control module, a water control module, and an electronic control module.

The waste holding module is comprised of a vacuum holding tank and the equipment necessary for its operation, a vacuum pump, electronic control panel and drain valve and may be located immediately adjacent the toilet module or at some remote location.

The complete fresh water vacuum-toilet waste system operation is completely automatic and only requires that the user initiate the flushing cycle by depressing a handle or button. This initiation procedure causes the electronic control module to sequence properly the flushing action of the water control module and opens the bowl through the flush control module to the vacuum holding tank, and then after a fixed time interval completes the flush cycle so as to be ready for another flush.

In the operation of the present invention only fresh water is used, thereby eliminating the need for recirculating pumps, valves, filter mechanisms and toilet deodorizing and sanitation chemicals. A unique feature of the instant invention is unlike recirculating systems which require up to a quart of flush fluid, the present system requires a maximum of eight ounces of water for a clean flush, thus providing for a greater number of flush cycles per volume of water carried, thereby reducing the weight of the overall system.

In another form of the invention in which the bowl module employs an ultrasonic transducer to enhance the flushing action of the water, the transducer operation without the presence of fresh water makes possible a clean dry flush. However, in most installations a small amount of water may be utilized for psychological effect.

A major feature of the instant invention's use of a fresh water flush-system is that the modular holding tank can be serviced in a one step operation. By opening of a waste drain valve, an automatic sequence is initiated draining the tank. Unlike recirculating systems which require draining of waste, initial charging of flush fluid and the addition of chemicals to deodorize and sanitize, the waste holding tank once drained is ready for the next flight.

OBJECT OF THE INVENTION

It is an object of the invention to provide a fresh water vacuum-flush toilet waste system for use in an aircraft and the like.

Another object of the invention is to provide a fresh water vacuum-flush toilet waste system that will operate without the use of gravity, thereby allowing the toilet module and waste holding module to be positioned in any desired location.

Another object of the invention is to provide a fresh water vacuum-toilet system in which no motors are used and the entire flushing sequence is electronically controlled.

A further object of the invention is to provide a vacuum flush toilet system in which a maximum of eight (8) ounces of fresh water is required for a clean aseptic flush.

Another object of the invention is to provide a vacuum-flush toilet module which utilizes smaller diameter drain lines than conventional gravity systems.

Another object is to provide a vacuum-flush toilet module with improved trap means to prevent small solid contaminants from entering the drain line system which cannot pass through the entire drain system.

Another object is to provide a fresh water vacuum-flush toilet waste system in which the component parts are modularized allowing for lower production costs, ease in servicing, enhance reliability and flexibility in system design and installation.

Other objects and advantages of this invention will appear in the following description and appended claims and will be more clearly understood when read with reference to the accompanying drawings.

Another object of the invention is to provide a fresh water vacuum-flush toilet with a simplified modular flush control valve operated by vacuum means.

Another object is to provide a fresh water vacuum toilet waste system for aircraft which utilizes the differential air pressure created between the aircraft interior and the exterior of the aircraft when at altitude as a vacuum motive force for opening the flush valve and sucking waste material into the hold tank.

It is another object of our invention to provide a fresh water vacuum-toilet waste system in which the vacuum phase of the system is provided with a vacuum accumulator of substantial size so that there will be ample vacuum-force available to enable the vacuum's system to fully actuate those parts which are operated by the vacuum.

It is a further object of our invention to provide a fire-safe arrangement whereby in case of fire the flush valve is metal protected and when the valve is in closed position, it will continue to function irrespective of whether or not parts of the system made from plastic materials are destroyed or deformed.

It is a further object of our invention to provide a vacuum flush toilet which is reliable in its operation and will continue to function over long periods of time without adjustment or repair.

BRIEF DESCRIPTION OF THE DRAWINGS

FIG. 1 is a schematic drawing of the preferred embodiment of the toilet module of the fresh water vacuum-flush toilet system of my invention.

FIG. 2 is a side elevational view of the preferred embodiment of my invention illustrating the assembled positions of the toilet module, the fresh water supply module, and the flush control module.

FIG. 3 is a cross-sectional view through the gooseneck of the drain passage from the toilet bowl and the vacuum operated flush valve and its vacuum controlled operating mechanism.

FIG. 4 is an enlarged fragmentary view showing the fire-safe bi-metal valve and check valve which is part of the flush valve module.

DESCRIPTION OF THE PREFERRED EMBODIMENT

Referring first to FIG. 1, the toilet module comprises four sub-modules which are shown within dotted lines areas of FIG. 1. The four sub-modules comprise a bowl module 10, an electronic control module 11, a water control module 12 and a flush valve module 13. Initiation of the flush cycle of the toilet is controlled by a button or handle 11a which may be located in a convenient place. Once a flush cycle is activated by actuating the control 11a, the electronic control module 11 sequences all necessary operations of the invention including signals to a remote vacuum blower 14a if the vacuum in the holding tank 14 is below a pre-set value.

As shown in FIG. 1, there is a fresh water supply line 15 which extends from a source of water under pressure 15a. The fresh water supply line includes a shut-off valve 16 and a solenoid valve 17 through which the water must flow. The valve 17 has a solenoid coil 17a which is energized from the control module 11 through an electrical conductor or cable 17b. The clapper valve 17c is held against its seat by a light spring 17d which closes the fresh water supply line 15 at this location. Water pressure below the clapper valve 17c increases the seating pressure so that no water can proceed to the toilet bowl.

Mounted on the side of the toilet bowl as shown in FIG. 2 is a unitized flow regulator 18 and an anti-syphon valve 20 which prevents reverse flow through the supply line 15 and thus prevents inadvertent contamination.

The flow regulator 18 has a member 19 which is preferably pre-formed from silicon rubber and has a variable orifice 19a therein which is distorted by water pressure drop. If the water pressure in the line 15 changes, the member 19 moves accordingly, changing the size of the orifice therein, thus regulating the flow of water to the toilet bowl irrespective of the water pressure. The anti-syphon valve 20 employs a jet-type sanitary water break without moving parts and prevents inadvertent contamination of the potable water supply. Also, this air bleed into the water system allows the system to drain when the supply water pressure is removed. An integral scupper returns any excess splash or back-up water to the bowl.

The water is delivered from this combination flow regulator and vacuum breaker to the spray ring 21 positioned in the upper part of the toilet bowl 22.

Extending downwardly from the bowl 22 is a drain 24 which includes a gooseneck 25 having the flush valve 26 positioned therein.

The gooseneck 25 is in the form of a metal casting and is designed to prevent the entry of large soft or solid contaminants which might not proceed through the remainder of the drain system. In a present embodiment of the invention, the smallest diameter of the gooseneck which is 1.5 inches is positioned near the bowl outlet and through the first curve of the gooseneck. The diameter then smoothly increases to 1.75 inches through the area of the diaphragm valve 26. Where the gooseneck extends downwardly toward the holding tank, the diameter is b 2.0 inches.

Connected to the gooseneck on the down flow side of the flush valve is a vacuum line having a fire-safe bimetallic safety valve 90 and having a check valve 29, which leads to a vacuum accumulator chamber 30. Solenoid valve 31 has a solenoid coil 32 connected by electrical conductor 32a to the control unit and through which it is energized. Opposite the vacuum line 28b is a passage 33 connected to the interior of the aircraft. When the valve 34 is in the position shown in FIG. 1, the control chamber 35 of the flush valve assembly 26 is connected to the pressure within the cabin and at that time the diaphragm valve 26 is in a position which closes the vacuum line 28b. When the solenoid 32 is energized, the valve 34 is moved to an upper position closing the passage 33 and opening the vacuum passage 28, connecting it to the control chamber 35. At this time, the diaphragm valve 26 moves to an open position.

Although not essential in most cases, numeral 40 shows a vibrating element which vibrates the toilet bowl to assist in disposing of the waste matter in the bowl. This vibrator element 40 is controlled through electrical wires 40a which extend to the control unit 11.

Before proceeding to a description of the details of construction and operation of the flush valve assembly, a brief description of the operation of the invention in its entirety will be given.

A flush cycle of the vacuum toilet is initiated by pushing the control switch 11a which actuates the control module 11 to initiate its sequencing of the flush cycle by first actuating the solenoid 17 which opens the valve 17c by moving it downward against the action of the spring 17d and water pressure. This opens the fresh water line supply 15 allowing water to flow under pressure to the toilet bowl module 10. The water usually enters the system under 15–30 pounds pressure. The water flows through the flow regulator 18 and the antisyphon device 20 to the spray ring 21 where it discharges the water on the inner surface of the bowl.

The electronic control module 11 next sequences the flush control module 13 by energizing the solenoid 32 of the valve 31 which raises the clapper valve 34 into its raised position and closes the passage 33 to the pressurized cabin of the aircraft. This changes the pressure in the control chamber 35 from cabin pressure to ambient pressure and thus causes the valve 26 to open. When the flush valve 26 opens, vacuum from the waste holding tank 14 is placed on the toilet bowl. This sucks the waste material and flush water in the bowl module outwardly through the drain 24 and gooseneck 25 to the holding tank 14. The holding tank 14 is placed under vacuum by the blower 14a at low elevations and ambient air at higher elevations.

The control module 11 is provided with means in which the voltage to operate the valves 17 and 31 is reduced to a low voltage approximately 0.5 seconds after the solenoids are energized by the higher voltage. This causes positive high-force operating voltage to move the clappers from their seats and thereafter automatically lowers the power to approximately 10 volts D.C. for a holding current. This is adequate to keep the solenoids in energized position and greatly reduces heat generation.

FIG. 3 shows a cross-sectional view of the gooseneck 25 and the flush control valve 26 which incorporates features of the present invention and contributes to the successful operation of the invention as a whole.

The gooseneck has an opening 50 surrounded by an external attaching flange 51. A flexible diaphragm 52 is held across the opening 50 by the bolted-on flange 53 of a vacuum accumulator housing 55 which provides the vacuum accumulator 30. A control chamber 35 is formed by a cylindrical housing 57 which has a cylindrical wall 58 with a bottom flange 59 which extends radially outwardly and is clamped between the flanges 51 and 53. The housing 57 has a top wall 60 from which a tubular extension 61 extends upwardly through the dome-shaped wall which forms the accumulator chamber 30. In the control chamber 35 above the diaphragm valve element 52 is a curved semi-cylindrical metal diaphragm engager 65 which at its center is connected by means of a connector element 66 to the center of the diaphragm 52.

A manual override handle 69 has a downwardly extending rod 70 which in its lower end has an opening 71 and a cross slot 72. Connected to the valve engager 65 is a rod 75 which extends into the passage 71 and has a cross pin 76 extending into the cross slot 72 on both sides of the opening 71. The lower end of the rod 70 has a ring-shaped bushing 77 which closes the lower end of the cross slot 72.

The length of the opening and slot in which the rod 75 extends is about the length of travel of the inner shaft or rod when the diaphragm valve moves between open and closed positions. Thus, the manual override handle does not move during a normal flush valve function. However, when manual override is desired, the handle is pulled off of the dentent 78 and lifted until the bushing 77 engages the cross pin 76 and at this point the inner shaft 75 is lifted. This opens the diaphragm valve. When the manual override is pushed downward past the spring detent, the valve is closed.

As shown in FIG. 4, the vacuum passage 28 which is connected to the gooseneck extends through a portion of the fitting or flange 51 where the check valve 29 is located. As shown in the enlarged view, the check valve moves between closed position as shown in full lines and open position as shown in broken line position and it functions as previously explained. As shown in FIG. 4 the check valve is normally in a closed position. If we assume that the valve is in a position in which there is pressure in the control pressure chamber 35, at this time, with the valve closed, there is the highest degree of vacuum in the drain pipe on the downstream side of the valve and the vacuum accumulator 30 contains the same degree of vacuum as the drain. When the valve control means is operated to connect the vacuum line to the control pressure chamber, air in the control pressure chamber will be drawn into the accumulator thus reducing the pressure in the control pressure chamber 35 and the valve will be moved to open position. At the time the valve is moved from its closed position the vacuum in the passage 28 will be reduced or in other words, the pressure will be slightly increased. This increase in pressure will hold the check valve in a closed position so that vacuum in the vacuum accumulator will not be destroyed or diminished but will be solely used for the purpose of opening the flexible valve element and holding it in an open position so that the contents of the toilet bowl can be completely removed and delivered to the vacuum holding tank. If it were not for the check valve 29, the instant the valve 52 were moved from its seated position this would cause a reduction in vacuum in the vacuum accumulator and the reduction in vacuum would affect the operation of the valve so that it might not fully open or move into an open position. The passage 29b which forms a part of the passageway 28 leads to the accumulator 30.

The clapper valve 34 is positioned above a wall 28a having an opening 28b in it which forms a continuation of the passage 28. When the solenoid 32 is energized, the valve 34 is in raised position and the opening 28b connects the vacuum accumulator space 30 with the control chamber 35 and thus produces a vacuum in the chamber 35 which raises the diaphragm valve 52 and the valve engager 65 into a raised position. The parts are now in the position shown by full lines in FIG. 3.

However, when the solenoid 32 is de-energized and the valve 34 allowed to lower into a position to close the passage 28b, the chamber 35 is in communication with cabin pressure through the passageway 33. At that time, this pressure from the cabin pushes downwardly on the diaphragm and diaphragm engager and assisted by a spring 80 moves the diaphragm into a closed position as indicated by dotted lines 81. This shuts off the passageway through the gooseneck. This dotted line position of the diaphragm 81 is the normal closed position of the flush valve and it remains in this position except when actuated by the control module 11.

Many parts of our invention are made from light plastic-type materials and are not fireproof. If a fire should occur and if parts of the vacuum drain line destroyed, or if the flush valve were destroyed so that the drain passage would be open, this would create air flow within the plane causing the fire to burn or enlarge its area more rapidly. One of the principal features of my invention is to provide means for eliminating the possibility of a vacuum flow through the exhaust line if any parts of the toilet were destroyed.

The gooseneck 25 and portions of the drain extending to the vacuum holding tank are made of metal. The diaphragm valve element 52, however, is formed of a non-metallic material and, therefore, if not protected would be subject to destruction. In my invention I provide the valve engager 65 as shown in FIG. 3 which is metal and when the valve is closed, this metal engager 65 engages and closes off the diaphragm 52.

In addition to this, there is the bi-metallic element 90 having two layers of metal 91 and 92. When the bi-metallic valve 90 is heated, it will straighten and move from its curved position into a position to close the opening 29b, thus shutting off any flow of air through this opening. In other words, this opening 29b is closed and, therefore, there cannot be any air flow at this point.

The invention includes many new features and advantages and modes of operation over toilets disclosed in the prior art, some of which are as follows: the toilet is made up of individual modules which are separately replaceable for low cost and easy replacement and care; it contains no motors; the structures and new combinations are simple and highly reliable; the toilet operates by vacuum on a small volume of water; the flow regulator for regulating water has no moving parts; the anti-syphoning device has no moving parts; the structures are simple and reliable and foolproof; the flush valve is a simple vacuum operated device and is provided with a manual override feature; because of the unique shape of the gooseneck, there will be no clogging of the toilet bowl drain; the control unit sequences the operations of the toilet, both from the standpoint of supplying water and flushing and the control unit is operated simply by pushing a single button; there is voltage-reducing means which comes into effect after an initial operation of the solenoids to reduce heat and to make the toilet substantially shockproof to users; vacuum furnished by the ambient atmosphere controls water flow and flush valve, as well as the withdrawal of waste material from the bowl; there is no contamination of potable water; when the system is shut down, the potable water is returned to the water storage tank.

In addition to those features and advantages and new actions specified above, there are other structural and functional features disclosed in the foregoing description of the features and advantages of the invention and in the detailed description of the construction and mode of operation.

In the specification and claims the terms "pressure" and "vacuum" are intended to be relative. Where the term "pressure" is used it refers to a pressure which may be imposed on the control chamber 35 which is adequate to close the flush valve. In the form of the invention shown and described in this application this pressure is cabin pressure. The term "vacuum" refers to a vacuum or any lesser pressure than is imposed on the flush valve to close the flush valve. The vacuum referred to is of a pressure which, when imposed on the control chamber 35, will cause the valve to open. In the form of the invention illustrated the word "vacuum" refers to the vacuum from the drain line and which may be imposed on the chamber 35 by opening the valve 34.

The term "fresh water or potable water" refers to clean water held in the potable water tank 15a. It can be the same water which passengers aboard the airplane use for drinking purposes.

We claim:

1. A non-circulating vacuum-operated flush waste disposal system for aircraft having a toilet comprising:
   a. a bowl for receiving waste matter,
   b. means for supplying rinse water to bowl,
   c. a drain for said bowl connected to a waste holding tank having a vacuum therein,
   d. a flush valve in said drain having a flexible valve element movable between closed and open positions, whereby said flush valve in open position applies vacuum to said toilet bowl,
   e. vacuum actuated means for opening said flush valve, said vacuum actuated means applying vacuum to the outer surface of said flexible valve element, and
   f. power means connected to said vacuum actuated means whereby vacuum may be applied thereto in order to open said flush valve, said flush valve automatically returning to closed position when power to said power means is discontinued.

2. A combination as defined in claim 1, in which:
   a. said vacuum actuated means has a control pressure chamber positioned in back of said flexible valve element,
   b. a passage connected to said control chamber having connection with a pressure source and a vacuum source, and
   c. valve means included in said power means operable to connect said passage to either said pressure source or said vacuum source whereby said flexible valve element by vacuum or pressure to the outer side thereof is moved between open and closed positions.

3. A combination as defined in claim 1, in which:
   a. there is a control pressure chamber adjacent said valve element, said valve element being moved and held in open or closed position depending upon whether or not there is a pressure or vacuum in said pressure chamber, said control pressure chamber normally being supplied with cabin air pressure to hold said valve closed, and in which
   b. said power means is operable to connect said control pressure chamber by a vacuum line to said drain on the downstream side of said flush valve, whereby vacuum from said drain will be supplied to said control pressure chamber to open said flush valve to flush said toilet bowl.

4. A combination as defined in claim 3 including valve means for closing the vacuum line to prevent air or other gaseous medium from flowing therethrough.

5. A combination as defined in claim 1 in which there is an override manually operable to open or close said valve.

6. A non-circulating vacuum operated flush waste disposal system for aircraft having a toilet, said system comprising:
   a. toilet bowl for receiving waste matter,
   b. a waste holding tank,
   c. means for applying a vacuum to said waste holding tank,
   d. a drain for said bowl connected to said waste holding tank and to said bowl,
   e. a flush valve in said drain, said flush valve having a valve element movable between open and closed positions whereby said drain may be opened or closed,
   f. a control pressure chamber adjacent said valve element, said valve element including a movable wall exposed directly to the pressure or vacuum within said control pressure chamber, said valve element being moved or held in open or closed position depending upon whether or not there is a pressure or a vacuum in said control pressure chamber,
   g. a source of vacuum and a source of pressure, and
   h. power means operable to connect said control chamber to said source of vacuum or to said source of pressure, whereby a vacuum or pressure in said control chamber may be applied to said valve element to open or close said valve depending upon whether there is a vacuum or a pressure applied to said valve element.

7. A combination as defined in claims 3 or 6 in which said source of vacuum is said drain on the downstream side of said flush valve and in which said control pressure chamber is connected to said drain by a vacuum line to said drain, which vacuum line includes a vacuum accumulator in said vacuum line and a check valve in said vacuum line between said vacuum accumulator and said drain to prevent a flow in said vacuum line to said vacuum accumulator from said drain.

8. A combination as defined in claim 6 in which there is a side opening in said drain and in which said flush valve has a flexible valve element extending across said side opening; a control pressure chamber adjacent said flexible valve element and in which said flexible valve element forms a wall of said control chamber so the flexible valve element is moved into a closed position within said drain when there is pressure in said control chamber and in which said flexible valve element is moved toward said control pressure chamber and into an open position when a vacuum is applied to said control pressure chamber.

9. A combination as defined in claim 6 having a vacuum accumulator in the connection to said source of vacuum whereby sufficient vacuum may be stored in order to hold said valve in an open position for a length of time sufficient to hold said flush valve open to suck all of the contents from said bowl and deliver same through said drain to said waste holding tank.

10. A combination as defined in claims 1 or 6 in which said power means includes a solenoid for holding said vacuum source open to said control pressure chamber and which upon discontinuance of energy to said solenoid, automatically connects said pressure source to said control pressure chamber.

11. A non-recirculating vacuum-operated flush waste disposal system for aircraft having a toilet comprising:
   a. a toilet bowl for receiving waste matter,
   b. means for supplying potable rinse water to said toilet bowl,
   c. a waste holding tank having a vacuum therein,
   d. a drain connected to said bowl to receive all contents of said bowl,
   e. a flush valve in said drain to said waste holding tank, said flush valve being movable between open and closed positions, said flush valve in open position connecting said toilet bowl to said vacuum holding tank to apply a vacuum to said toilet bowl whereby all of the contents of said toilet bowl are removed to said holding tank by said vacuum,
   f. vacuum actuated means for opening said flush valve,
   g. a vacuum connection between said vacuum actuated means and said drain on the downstream side of said flush valve,
   h. a vacuum accumulator in said vacuum connection,
   i. a check valve in said vacuum connection between said vacuum accumulator and said drain,
   j. a manually operable power means in said vacuum connection including means for maintaining said vacuum connection open to said vacuum accumulator and thereby maintaining said flush valve open until all of the contents of said toilet bowl have been delivered to said holding tank, and
   k. means for disconnecting said vacuum connection from its vacuum source when said power means is de-energized, thus causing said flush valve to return to closed position.

12. A combination as defined in claim 2 in which:
   a. there is a passage connected to said control chamber having a cabin pressure connection and a vacuum connection and in which there is a solenoid valve operating between said connections, whereby said valve may close either one of said connections, and
   b. in which said valve is operated by said solenoid which when energized moves said valve to close said cabin pressure connections so long as said solenoid is being energized.

* * * * *